United States Patent [19]
Hudson

[11] Patent Number: 5,699,712
[45] Date of Patent: Dec. 23, 1997

[54] ROTATABLE SIDE SAW FOR TREE PROCESSING APPARATUS

[75] Inventor: Thomas H. Hudson, Hueytown, Ala.

[73] Assignee: Timberjack Corporation, Hueytown, Ala.

[21] Appl. No.: 697,535

[22] Filed: Aug. 26, 1996

[51] Int. Cl.$^6$ ................................. A01G 23/08
[52] U.S. Cl. .................... 83/928; 144/4.1; 144/335; 144/338; 83/795
[58] Field of Search ............... 83/795, 796, 928; 144/34.1, 4.1, 355, 338, 24.13; 30/379, 379.5

[56] References Cited

U.S. PATENT DOCUMENTS

| | | |
|---|---|---|
| 3,972,357 | 8/1976 | Neal et al. ........................ 83/928 X |
| 4,792,190 | 12/1988 | Bertrand ........................... 83/928 X |
| 4,832,412 | 5/1989 | Bertrand ........................... 83/928 X |
| 5,086,684 | 2/1992 | Johnson ............................. 83/795 |
| 5,322,103 | 6/1994 | Hudson ............................ 144/24.13 |

OTHER PUBLICATIONS

CTR Manufacturing, Inc. 2 pages of Advertising form 032 for CTR Model 314 Whole Tree Processor.

*Primary Examiner*—W. Donald Bray
*Attorney, Agent, or Firm*—Veal & Associates

[57] ABSTRACT

A side saw assembly for a tree processing apparatus. The side saw assembly is rotatably and pivotally attached to a mounting platform on a trailer such that the side saw assembly is selectively movable between a transport position, resting on top of the trailer, and ground positions, resting on the ground adjacent either side of the trailer. A connecting arm is pivotally attached at one end to a swivel mount, which is affixed to a side saw assembly. At its other end, the connecting arm is pivotally attached to a swivel mount affixed to the mounting platform. A lift handle is attached to the side saw assembly such that it may be grasped by the grapple of a knuckle boom loader to move the side saw assembly from the transport position to the ground position on one side of the trailer or the other.

10 Claims, 2 Drawing Sheets

ROTATABLE SIDE SAW FOR TREE PROCESSING APPARATUS

FIELD OF THE INVENTION

The present invention relates to a tree processing apparatus, and more particularly to the side saw present on such an apparatus. Still more particularly, the present invention relates to a side saw which is rotatably and pivotally mounted on the frame of the apparatus such that it may be positioned on either side of the tree processing apparatus.

BACKGROUND OF THE INVENTION

Tree processing devices for delimbing and topping trees, and for bucking the trees to the desired length are generally known in the prior art of the forestry and tree harvesting industry. It is known to mount a delimber, a topping saw, and a side saw on a single trailer to facilitate the processing steps.

A felled tree is typically held by a knuckle boom loader and moved through the delimber to strip the outwardly extending limbs of the tree. The topping saw is mounted adjacent the delimber to cut the top off of the tree. The stripped tree is then placed in the side saw to be cut into lengths. In the past, the side saw has been permanently mounted on one side of the trailer. The position of the side saw had to be taken into account in placing the tree processing trailer on a work site. Depending upon the terrain and other obstacles, the fixed position of the side saw on one side of the trailer was a limiting factor. There is a need for a side saw which is movable from one side of the trailer to the other, allowing greater flexibility in the placement of the trailer.

SUMMARY OF THE PRESENT INVENTION

With the foregoing in mind, it is the principal object of the present invention to provide a side saw for a tree processing apparatus which may be rotated from one side of the apparatus to the other.

Another object of the invention is to provide greater flexibility with regard to the positioning of a tree processing trailer on a worksite.

These and other objects of the present invention are accomplished through the use of a side saw assembly which is rotatably and pivotally attached to a mounting platform on a trailer such that the side saw assembly is selectively movable between a transport position, resting on top of the trailer, and ground positions, resting on the ground adjacent either side of the trailer. A connecting arm is pivotally attached at one end to a swivel mount, which is affixed to a side saw assembly. At its other end, the connecting arm is pivotally attached to a swivel mount affixed to the mounting platform. A lift handle is attached to the side saw assembly such that it may be grasped by the grapple of a knuckle boom loader to move the side saw assembly from the transport position to the ground position on one side of the trailer or the other.

BRIEF DESCRIPTION OF THE DRAWINGS

The foregoing objects and advantages of the present invention for a rotatable side saw for a tree processing apparatus will be more readily understood by one skilled in the art by referring to the following detailed description of a preferred embodiment and to the accompanying drawings which form a part thereof, and wherein.

DETAILED DESCRIPTION OF THE PREFERRED EMBODIMENT

Figure 1:
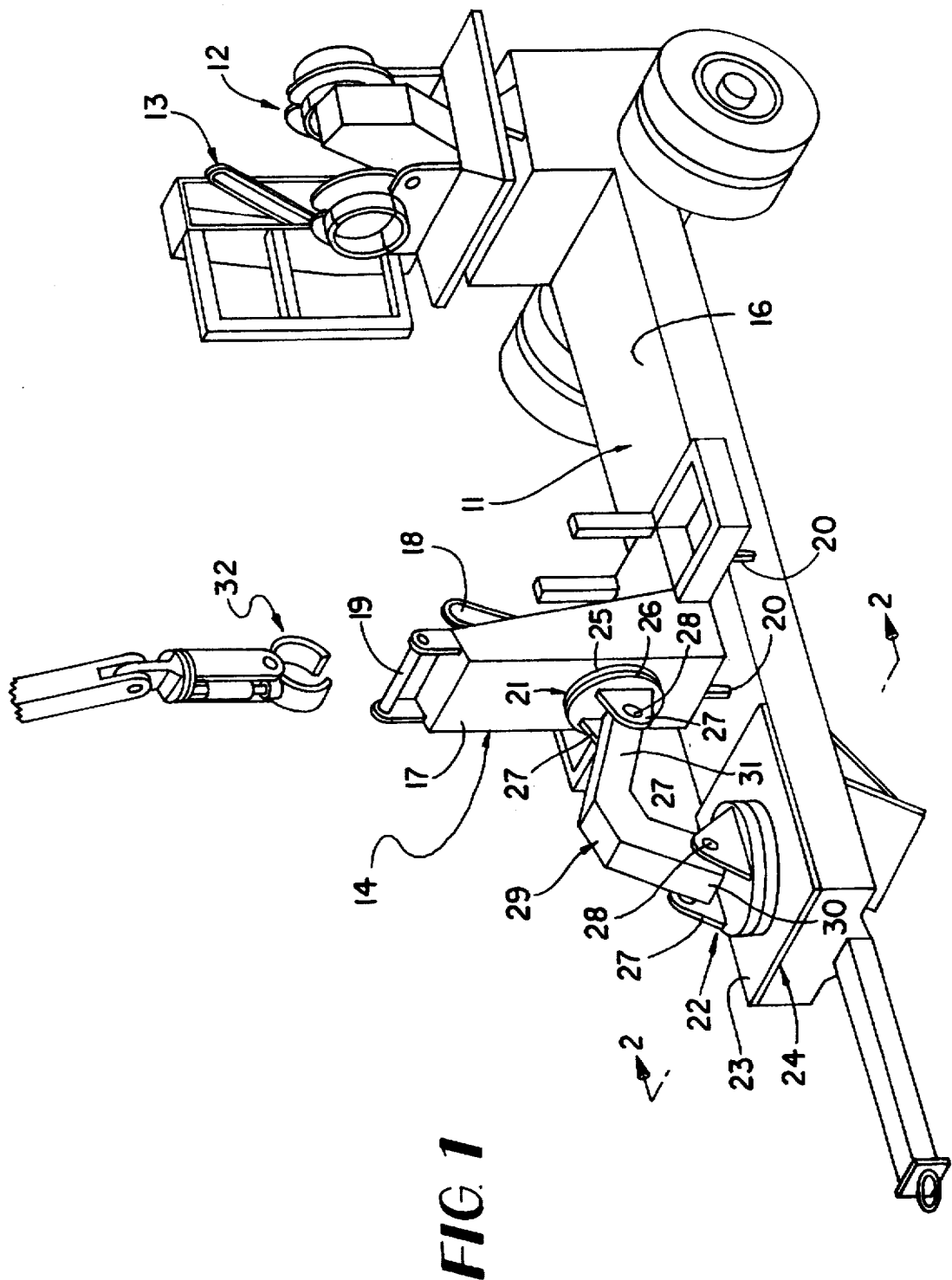
FIG. 1 is a perspective view of a tree processing trailer, showing the rotatable side saw of the present invention in its transport position.
Figure 2:
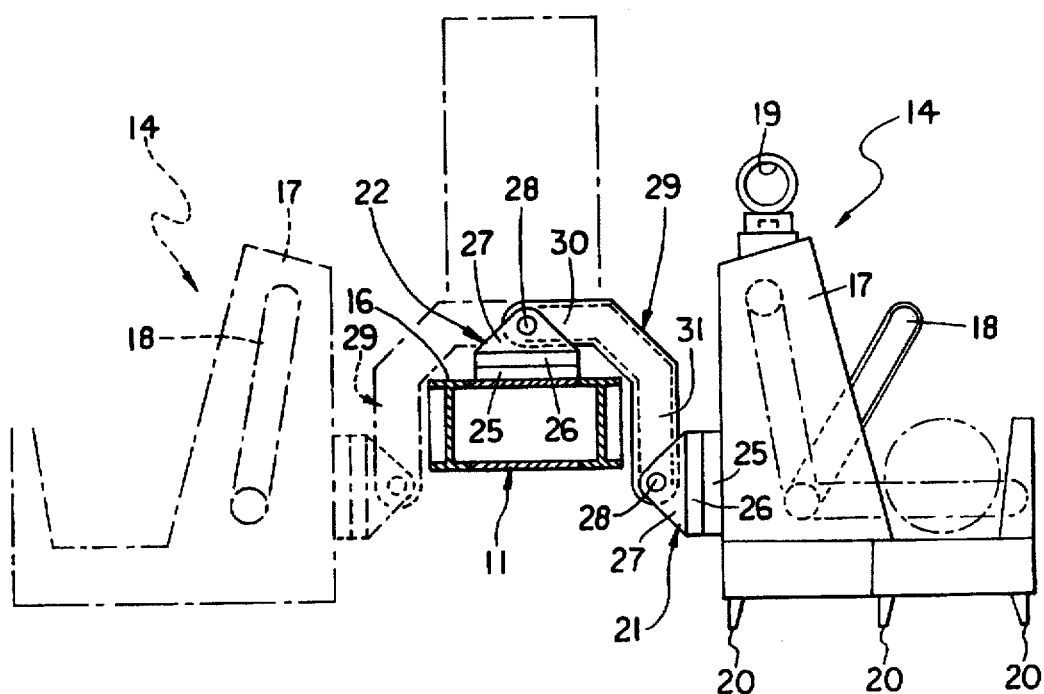
FIG. 2 is a sectional view of the trailer and side saw, taken along line 2—2 of FIG. 1, showing the side saw in its first ground position, with a second ground position and transport position being shown in phantom.
Figure 3:
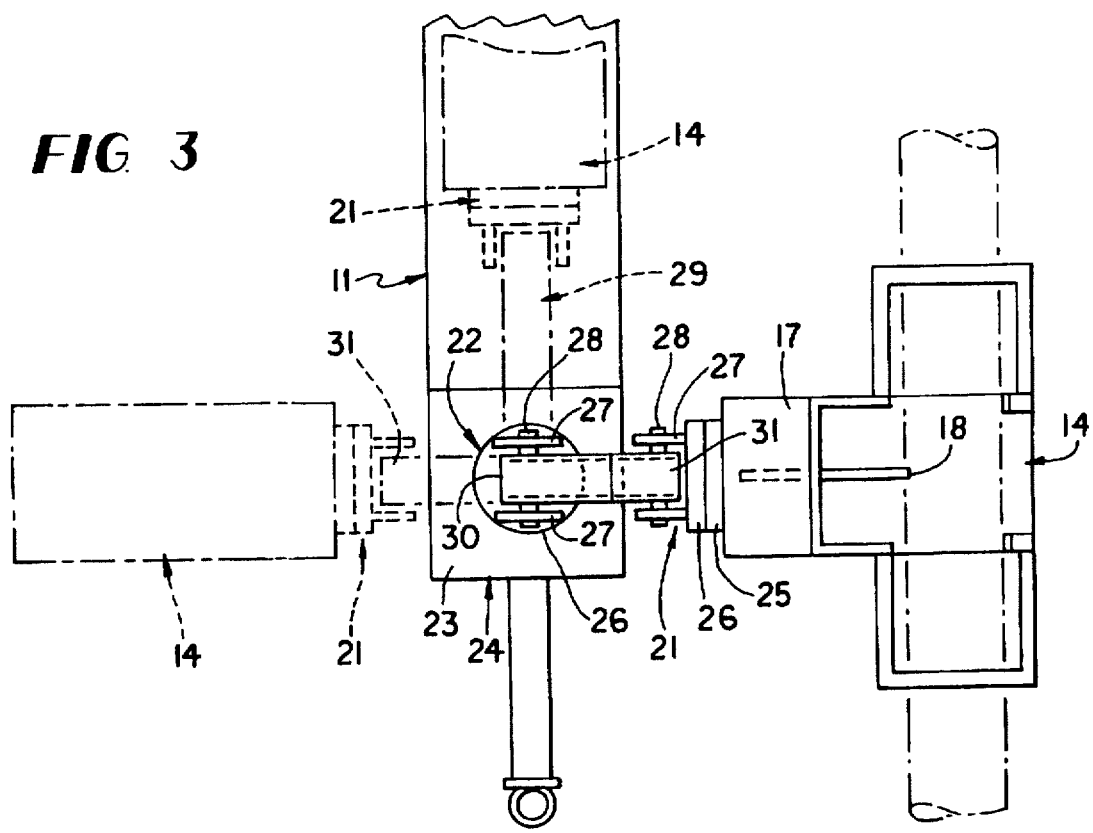
FIG. 3 is a top plan view of the side saw, shown in its first ground position, with a second ground position and transport position being shown in phantom.

A tree processing trailer 11 is shown in FIG. 1. A delimber head 12 and a topping saw 13 are mounted at one end of the trailer 11. A side saw assembly 14 is shown resting on the upper surface 16 of the trailer 11 in its transport position. The side saw assembly 14 includes a frame 17 and a saw 18. A lift handle 19 is mounted to the top of the frame 17 of the side saw assembly 14. The lift handle 19 may be rigidly affixed to the frame 17 of the side saw assembly 14 as shown in FIG. 1, or alternatively, it may be rotatably mounted on the frame 17 as shown in FIG. 2. The frame 17 of the side saw assembly 14 includes support legs 20 which are in contact with the ground and stabilize the side saw assembly 14 when the side saw assembly 14 is in its first ground position, as shown in FIGS. 2 and 3, or its second ground position, as shown in phantom in FIGS. 2 and 3. A swivel mount 21 is affixed to the frame 17 of the side saw assembly 14. Another swivel mount 22 is affixed to the upper surface 23 of a mounting platform 24 on the trailer 11. Swivel mounts 21 and 22 each include a fixed plate 25, a rotating plate 26 and bearing means between the fixed and rotating plates. The rotating plate 26 of each swivel mount 21 and 22 has a pair of outwardly extending arms 27 with apertures therethrough for receiving pins 28. A connecting arm 29 has a first end 30 and a second end 31. The first end 30 of the connecting arm 29 is pivotally connected to the arms 27 of the rotating plate 26 of swivel mount 22, on the platform 24 of the trailer 11, by a pin 28. The second end 31 of the connecting arm 29 is pivotally connected by a pin 28 to the arms 27 of the rotating plate 26 of swivel mount 21, on the frame 17 of the side saw assembly 14.

To move the side saw assembly 14 from its transport position, as shown in FIG. 1, to a ground position on either side of the trailer 11, the lift handle 19 is grasped by the grapple 32 of a knuckle boom loader (not shown) and lifted off of the upper surface 16 of the trailer 11. The side saw assembly 14 may then be placed on the ground on one side of the trailer or the other, as shown in FIGS. 2 and 3.

The operation of the side saw is more fully set out in U.S. Pat. No. 5,322,103, which is incorporated herein by reference. The saw is hydraulically driven. Hydraulic fluid is supplied through lines (not shown) carried in the frame of trailer 11 from a remote pump (not shown). A diverter valve carried in the frame of the trailer 11 operates to divert hydraulic fluid from the topping saw 13 to the side saw assembly 14 when the side saw is moved to its first or second ground position. The lines pass from the trailer 11 to the side saw assembly 14 through apertures in the fixed and rotating plates 25 and 26 of the swivel mounts 21 and 22, and through the interior of connecting arm 29, which is hollow and may be of tubular steel construction. In addition to providing protection to the hydraulic lines, the connecting arm 29 is shaped to properly position and provide stability to the side saw assembly 14 in either its transport or ground positions.

While I have shown my invention in one form, it will be obvious to those skilled in the art that it is not so limited but is susceptible of various changes and modifications without departing from the spirit thereof.

Having set forth the nature of the invention, what I claim is:

1. An apparatus for bucking trees comprising:
   a) a trailer, having a mounting platform, an upper surface, a first side and a second side; and
   b) a side saw assembly, rotatably and pivotally mounted to said mounting platform of said trailer for selective movement between a transport position adjacent said upper surface of said trailer, a first ground position proximal said first side of said trailer and a second ground position proximal said second side of said trailer.

2. An apparatus as defined in claim 1, further comprising a first swivel mount attached to said mounting platform, and a second swivel mount attached to said side saw assembly.

3. An apparatus as defined in claim 2, further comprising a connecting arm having a first end and a second end, said first end pivotally attached to said first swivel mount and said second end pivotally attached to said second swivel mount.

4. An apparatus as defined in claim 3, further comprising a lift handle, rotatably attached to said side saw assembly and adapted to support the weight of said side saw assembly during said selective movement.

5. An apparatus as defined in claim 4, wherein said lift handle is rotatably affixed to said side saw assembly.

6. An apparatus for bucking trees to a desired length, comprising:
   a) a side saw assembly;
   b) a trailer, having an upper surface, a first side and a second side; and
   c) connecting means for rotatably and pivotally connecting said side saw assembly to said trailer such that said side saw assembly is selectively movable between a transport position adjacent said upper surface of said mounting platform, a first ground position proximal said first side of said mounting platform and a second ground position proximal said second side of said mounting platform.

7. An apparatus as defined in claim 6, wherein said connecting means comprises:
   a.) A mounting platform, attached to said trailer;
   b) a first swivel mount attached to said mounting platform;
   c) a second swivel mount attached to said side saw assembly; and
   d) a connecting arm having a first end and a second end, said first end pivotally attached to said first swivel mount and said second end pivotally attached to said second swivel mount.

8. An apparatus as defined in claim 7, further comprising a lift handle, rigidly attached to said side saw assembly.

9. An apparatus as defined in claim 7, further comprising a lift handle, rotatably attached to said side saw assembly.

10. An apparatus for bucking trees to a desired length, comprising:
   a) a trailer;
   b) a mounting platform, having an upper surface, said mounting platform affixed to said trailer;
   c) a first swivel mount, affixed to said upper surface of said mounting platform;
   d) a connecting arm, having a first end and a second end, said first end pivotally connected to said swivel mount;
   e) a side saw assembly; and
   f) a second swivel mount, affixed to said side saw assembly, said second swivel mount pivotally connected to said second end of said connecting arm.

* * * * *